(No Model.)

J. H. BUNN.
SEED PLANTER AND CULTIVATOR.

No. 317,968. Patented May 19, 1885.

WITNESSES

INVENTOR
James H. Bunn
By C. A. Snow & Co.
Attorneys

UNITED STATES PATENT OFFICE.

JAMES HERVEY BUNN, OF HENNING, TENNESSEE.

SEED-PLANTER AND CULTIVATOR.

SPECIFICATION forming part of Letters Patent No. 317,968, dated May 19, 1885.

Application filed July 18, 1884. (No model.)

*To all whom it may concern:*

Be it known that I, JAMES HERVEY BUNN, a citizen of the United States, residing at Henning, in the county of Lauderdale and State of Tennessee, have invented a new and useful Seed-Planter and Cultivator, of which the following is a specification, reference being had to the accompanying drawings.

This invention has relation to combined seed-planters and cultivators, and it has for its object to provide an implement of the class referred to that shall possess superior advantages in point of simplicity, cheapness, durability, and general efficiency; and the invention consists in the construction and novel arrangement of parts, as will be hereinafter fully described, and particularly pointed out in the claim.

Figure 1:
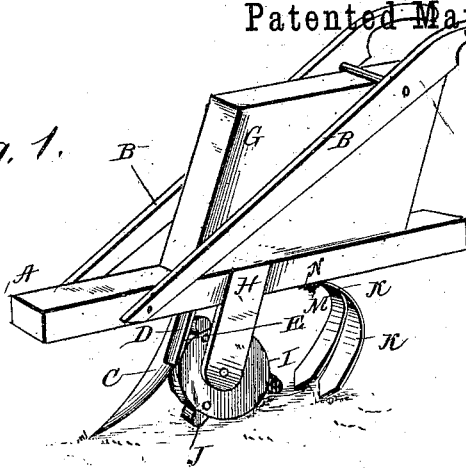
Figure 2:
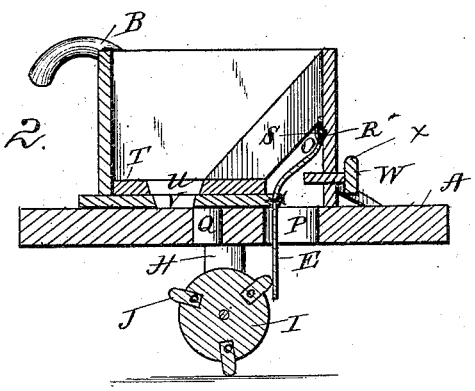
Figure 3:
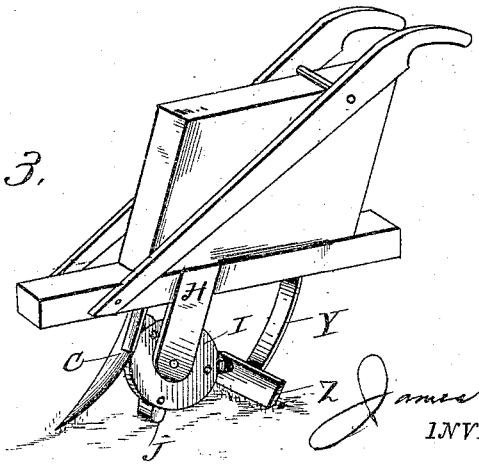

In the drawings, Figure 1 is a view in perspective of a combined seed-planter and cultivator embodying my improvements. Fig. 2 is a vertical longitudinal sectional view. Fig. 3 is a view in perspective of the implement arranged for use as a seed-planter in ground that has not been previously broken by the plow.

Referring by letter to the accompanying drawings, A designates the plow-beam and B the handles.

C is the opening plow that makes the furrow in which the seed is dropped. The plow C is secured to a standard, D, projecting from the beam A, immediately in front of the spring E, that operates the seed slide or valve F in the seed-hopper G.

H H are inclined hangers of iron bolted to the sides of the plow-beam and provided with bearings at their lower ends for the shaft of the knocker-wheel I, which is provided with arms J on its periphery, which, when the knocker-wheel I revolves, strike the spring E and operate the seed-slide and drops the seed into the furrow. The arms J are made removable so that the distance between them may be regulated to regulate the distance between the hills of seed.

K K designate the covering-plows, which are attached to the beam in rear of the knocker-wheel I. Their standards are curved, as shown, and connected at the top or form in one piece, L. The portion L is provided with a bolt-hole through which a bolt, M, is passed up through the beam and secured firmly in place by a nut, N. The spring E is of steel, bent as shown, and secured in a recess, O, in the hopper, and projects down through an opening, P, in the plow-beam in front of the seed-discharge opening Q in said beam.

The spring E is provided with an elongated vertical slot, R, in it, through which a headed screw, S, is passed into the forward end of the seed-slide F.

The hopper is provided with a bottom, T, having a seed-opening, U, made near its rear side.

Beneath the bottom T and upon the upper face of the plow-beam, rests the seed-slide F, which is also provided with a seed-opening, V, which, when the seed-slide is in its normal position, rests under the seed-opening U and is filled with seed.

When the knocker-wheel I revolves and either of the arms J strikes the spring E, the spring is forced forward and draws the seed-slide forward, moving the filled seed-opening V over the discharge-opening Q in the plow-beam, and the seed falls through the opening Q into the furrow, where it is covered by the covering-plows K K.

In the front side of the hopper is provided an adjusting-screw, W, which is provided with a wrench, X, by which said screw may be adjusted in front of the spring E to regulate the distance to which the seed-slide may be moved, and thus regulate the quantity of seed to be dropped. The spring will bend below the stop X so that it will not prevent the knocker-wheel from revolving.

The foregoing is the arrangement of the parts when the implement is to be used as a planter in planting in plowed ground. When planting bed or unplowed ground, the covering-plows K K are removed and the standard Y, with the coverer Z, is substituted and secured in place by the same bolt that held the covering-plows. In this latter instance the opening-plow opens the furrow and the scraper covers the seed. When there is no seed in the hopper, the implement, with the opening-plow and covering-plows in place, may be used as a cultivator.

Having thus fully described my invention, what I claim as new and desire to secure by Letters Patent of the United States, is—

The combination, with the hopper having the feed-slide connected to the spring E, secured within the hopper and projecting down through an opening in the plow-beam, of the knocker-wheel provided with the removable cams J and the adjusting-screw W, substantially as specified.

In testimony that I claim the foregoing as my own I have hereto affixed my signature in presence of two witnesses.

JAMES HERVEY $\overset{\text{his}}{\times}$ BUNN.
mark.

Witnesses:
BLAIR PIERSON,
WM. E. LYNN.